US012665230B2

(12) United States Patent
Kim

(10) Patent No.: US 12,665,230 B2
(45) Date of Patent: Jun. 23, 2026

(54) BATTERY MODULE PREVENTING THERMAL RUNWAY

(71) Applicant: SEOYON E-HWA CO., LTD., Anyang (KR)

(72) Inventor: Sung Su Kim, Suwon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 563 days.

(21) Appl. No.: 18/178,404

(22) Filed: Mar. 3, 2023

(65) Prior Publication Data

US 2023/0282897 A1 Sep. 7, 2023

(30) Foreign Application Priority Data

Mar. 7, 2022 (KR) ........................ 10-2022-0028522

(51) Int. Cl.
| | |
|---|---|
| *H01M 10/613* | (2014.01) |
| *H01M 10/42* | (2006.01) |
| *H01M 10/48* | (2006.01) |
| *H01M 10/625* | (2014.01) |
| *H01M 10/6554* | (2014.01) |
| *H01M 10/6568* | (2014.01) |

(52) U.S. Cl.
CPC ......... *H01M 10/48* (2013.01); *H01M 10/425* (2013.01); *H01M 10/613* (2015.04); *H01M 10/625* (2015.04); *H01M 10/6554* (2015.04); *H01M 10/6568* (2015.04); *H01M 2010/4271* (2013.01); *H01M 2220/20* (2013.01)

(58) Field of Classification Search
CPC ...................... H01M 10/6568; H01M 10/6554
See application file for complete search history.

(56) References Cited

U.S. PATENT DOCUMENTS

| | | | |
|---|---|---|---|
| 8,313,850 B1 | 11/2012 | LePort | |
| 2015/0086831 A1* | 3/2015 | Haussmann | ........ H01M 10/613 |
| | | | 429/120 |
| 2018/0241103 A1* | 8/2018 | Pfeiff | ................ H01M 10/6554 |
| 2020/0406784 A1* | 12/2020 | Yoshida | ................... B60K 1/00 |

FOREIGN PATENT DOCUMENTS

| | | | | |
|---|---|---|---|---|
| CN | 108963385 A | * | 12/2018 | .......... H01M 10/613 |
| CN | 110696680 A | * | 1/2020 | ............. B60L 58/24 |
| CN | 111137173 A | | 5/2020 | |
| CN | 111952492 A | * | 11/2020 | .......... H01M 10/613 |
| CN | 110696680 B | | 2/2022 | |

(Continued)

OTHER PUBLICATIONS

Machine translation of KR 20170112495A from Espacenet (Year: 2017).*

(Continued)

*Primary Examiner* — Nicholas A Smith
*Assistant Examiner* — Zackary Richard Cochenour
(74) *Attorney, Agent, or Firm* — Harvest IP Law, LLP

(57) ABSTRACT

According to one aspect or the present invention, a battery module for an electric vehicle including a battery cell constituting a battery module, a sensing pad attached to a side surface of the battery cell, a battery management system (BMS) which performs transmission and reception communication with the sensing pad, and a cooling water pipe disposed under the battery cell can be provided.

7 Claims, 3 Drawing Sheets

(56)                        References Cited

FOREIGN PATENT DOCUMENTS

| KR | 20140025674 | A | * | 3/2014 | ............ H02H 9/001 |
|---|---|---|---|---|---|
| KR | 20160049899 | A |  | 5/2016 | |
| KR | 20170027074 | A |  | 3/2017 | |
| KR | 20170112495 | A |  | 10/2017 | |
| KR | 20200104619 | A |  | 9/2020 | |
| KR | 102269221 | B1 |  | 6/2021 | |

OTHER PUBLICATIONS

Machine translation of KR 102269221 B1 from Espacenet (Year: 2021).*

Machine translation of KR 20140025674 A from espacenet (Year: 2014).*

Machine Translation of CN 110696680 A from espacenet (Year: 2020).*

Machine translation of CN 108963385A from espacenet (Year: 2020).*

The Office Action issued by the Indian Patent Office on Oct. 1, 2024.

The Office Action issued by the Chinese Patent Office on Jul. 26, 2025.

* cited by examiner

C

400

BATTERY MODULE PREVENTING THERMAL RUNWAY

CROSS-REFERENCE TO RELATED APPLICATION(S)

This application claims priority from Korean Patent Application No. 10-2022-0028522, filed on Mar. 7, 2022, in the Korean Intellectual Property Office, the disclosure of which is incorporated herein by reference in its entirety.

BACKGROUND

1. Field

The following description relates to a battery module for an electric vehicle to which a thermal runaway prevention structure is applied.

2. Description of Related Art

A cell, which is a basic unit constituting a battery module, generates heat causing a swelling phenomenon on a surface portion of the cell when the battery module is rapidly charged or discharged. The cell in which the swelling phenomenon occurs leads to an increase in surface pressure between cells in the battery module. Accordingly, a cell bent portion may open and the cell may not function normally, or a safety problem such as fire occurs due to a short circuit, and thus effort for preventing these problems is required.

RELATED ART

Patent Document

Korean Patent Publication No. 10-2017-0027074 (Disclosed on Mar. 9, 2017)

SUMMARY

Embodiments of the present invention are directed to providing a battery module in which a thermal runaway phenomenon generated with a swelling phenomenon is prevented by module pressure sensing and cooling system sensing.

Technical objectives to be achieved through the embodiments of the present invention are not necessarily limited to the above-described technical objectives. Other technical objectives which are not described above will be clearly understood by those skilled in the art from the following specification including the detailed description.

In one aspect of the present invention, a battery module for an electric vehicle includes a battery cell constituting a battery module, a sensing pad attached to a side surface of the battery cell, a battery management system (BMS) which performs transmission and reception communication with the sensing pad, and a cooling module disposed under the battery cell.

DETAILED DESCRIPTION

Hereinafter, embodiments of the present invention will be described with reference to the accompanying drawings. The following embodiments are provided to more completely describe the present invention to those skilled in the art. However, the following embodiments are provided to facilitate understanding of the present invention, and the technical spirit of the present invention is not limited thereto. In addition, components which are known or obscure the technical gist of the present invention will not be described.

Figure 1:
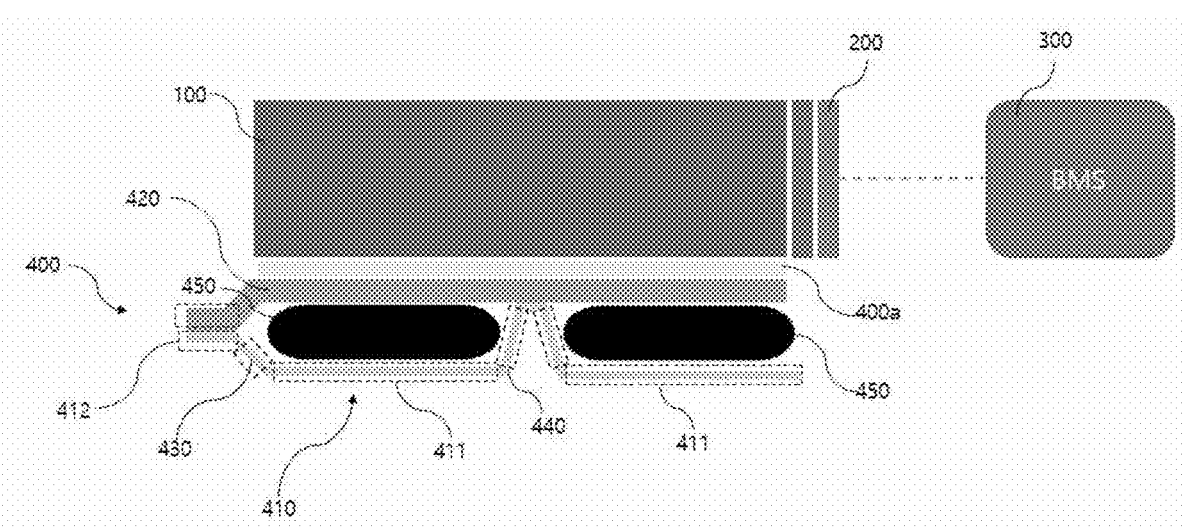
FIG. 1 is a view illustrating a one side cross section of a battery module according to one embodiment of the present invention.

FIG. 1 is a view illustrating a one side cross section of a battery module according to one embodiment of the present invention.

Referring to FIG. 1, the battery module according to the present embodiment includes a battery cell 100 constituting the battery module, a sensing pad 200 attached to a side surface of the battery cell 100, a battery management system (BMS) 300 configured to perform transmission and reception communication with the sensing pad 200, and a cooling module 400 disposed under the battery cell 100. Hereinafter, each component will be described in detail with reference to the accompanying drawings.

The battery module according to the present embodiment may include the battery cell. The battery cell 100 may be a vehicle battery configured to supply electricity to an electric vehicle. The battery cell 100 may be provided as a plurality of battery cells 100 and formed as a type of a battery pack. In addition, the battery pack formed as a bundle of the battery cells 100 may be provided as one or more battery packs. In addition, the battery pack may be formed as the bundle of the battery cells 100 connected in parallel or series to supply the electricity to the vehicle.

The sensing pad 200 may be disposed on the side surface of the battery cell 100 or the battery pack. The sensing pad 200 may be disposed at a position other than positions at which positive (+) and negative (−) taps of the battery cell 100 are formed. The sensing pad 200 disposed as described above may be a measurement device for measuring a swelling phenomenon of the battery cell 100. As an example, the sensing pad may be formed of a plurality of strain gauges, but as long as the sensing pad is a measurement device capable of measuring an expansion pressure of the battery cell 100, the measurement device may be changed. In addition, the sensing pad 200 may be formed in a form in which a plurality of strain gauges or other pressure measurement devices may be connected. The sensing pad 200 may measure a degree of swelling in which one side of the battery cell 100 expands and transmit the degree of swelling to the BMS 300. In this case, a value measured by the sensing pad 200 may be a surface pressure value generated when one side of the battery cell expands or contracts. Accordingly, a signal transmitted from the sensing pad 200 to the BMS 300 may have a value in kPa which is a unit of pressure. In addition, calculation may be performed by the BMS 300 on the basis of the signal transmitted from the sensing pad 200 to divide a normal section and a warning section, and in the case of the warning section, a corresponding thermal runaway prevention operation may be performed. In this case, the performed corresponding thermal runaway prevention operation will be described below with a description about the cooling module 400.

The cooling module 400 may be disposed under the battery cell 100.

The cooling module 400 may be provided to cool heat generated by the battery cell 100 and the battery pack. The cooling module 400 may be disposed at a position at which the cooling module 400 is in contact with one side of the battery cell 100.

Meanwhile, the cooling module 400 according to one embodiment of the present invention may include a cooling plate lower base 410. The cooling plate lower base 410 may be formed as one side portion of a battery case which protects the battery cell 100. The cooling plate lower base 410 may be formed in the form of a plate. In addition, in the cooling plate lower base 410, a plurality of bent portions may be formed.

The cooling plate lower base 410 according to one embodiment of the present invention may include lower surface support end portions 411. The lower surface support end portions 411 may be portions which support a lower side of the cooling plate lower base 410 and a lower side of the battery module. Each of the lower surface support end portions 411 may be horizontally formed. In addition, the lower surface support end portions 411 may be formed on a lower surface of the cooling plate lower base 410 in contact with an installation surface to support a lower portion in the cooling plate lower base 410. The lower surface support end portions 411 may be not only portions supported by the ground but also walls in contact with lower sides of cooling water pipes 450 to protect lower portions of the cooling water pipes 450.

Meanwhile, in the cooling plate lower base 410 according to one embodiment of the present invention, a cooling welding end portion 412 may be formed. The cooling welding end portion 412 may be a portion bent to be spaced a predetermined distance upward from the lower surface support end portion 411 of the cooling plate lower base 410. In this case, the distance by which the cooling welding end portion 412 is spaced apart from the ground may be in the range of 2 mm to 5 mm. The cooling welding end portion 412 may be formed to be bent upward from the lower surface support end portion 411 at an angle of 30° to 60° and then bent downward. In this case, the cooling welding end portion 412 bent downward may be formed parallel to the lower surface support end portion 411 of a cooling welding end. Accordingly, in the cooling plate lower base 410, a wall surface which protects one lower side of a portion in which a cooling path is disposed may be formed. In addition, the cooling welding end portion 412 may be a portion to be welded to a cooling plate upper base 420 which will be described below. Accordingly, the cooling welding end portion 412 may be formed to have a sufficient area to be welded to the cooling plate upper base 420 which will be described below using a sufficient bonding force.

Meanwhile, the cooling welding end portion 412 and one side of the lower surface support end portion 411 may be connected by a bonding inclination end portion 430. The bonding inclination end portion 430 may be formed inclined from the lower surface support end portion 411. In this case, an inclined angle and a length of the bonding inclination end portion 430 may be formed so that the cooling welding end portion 412 and the cooling water pipes 450 may be sufficiently spaced apart from each other. Accordingly, when welding work is performed on the cooling welding end portion 412, a phenomenon in which the cooling water pipes 450 are damaged may be prevented. The bonding inclination end portion 430 may be formed as a wall which supports one side of each of the cooling water pipes 450 so that the cooling water pipes do not move.

Meanwhile, at the other side of the lower surface support end portion 411, pipe wall surfaces 440 of which cross sections have an upside down "V" shape may be formed. The cooling water pipes 450 may be in contact with outer surfaces of two end portions of the pipe wall surfaces 440 formed in the upside down "V" shape. Accordingly, each of the pipe wall surfaces 440 may be a wall which is in contact with and supports one side of the cooling water pipe 450. In addition, each of the two end portions formed at the pipe wall surfaces 440 may be formed at an angle of 60° to 90° with respect to a ground support end portion. The pipe wall surfaces 440 formed as described above may be formed so that gaps between the cooling water pipes 450 are dense. In addition, the pipe wall surfaces 440 may be formed to correspond to a path along which the cooling water pipes 450 are disposed. In this case, the plurality of pipe wall surfaces 440 may be formed to have predetermined lengths to be spaced a predetermined distance from each other to correspond to the cooling water pipes 450.

Figure 2:
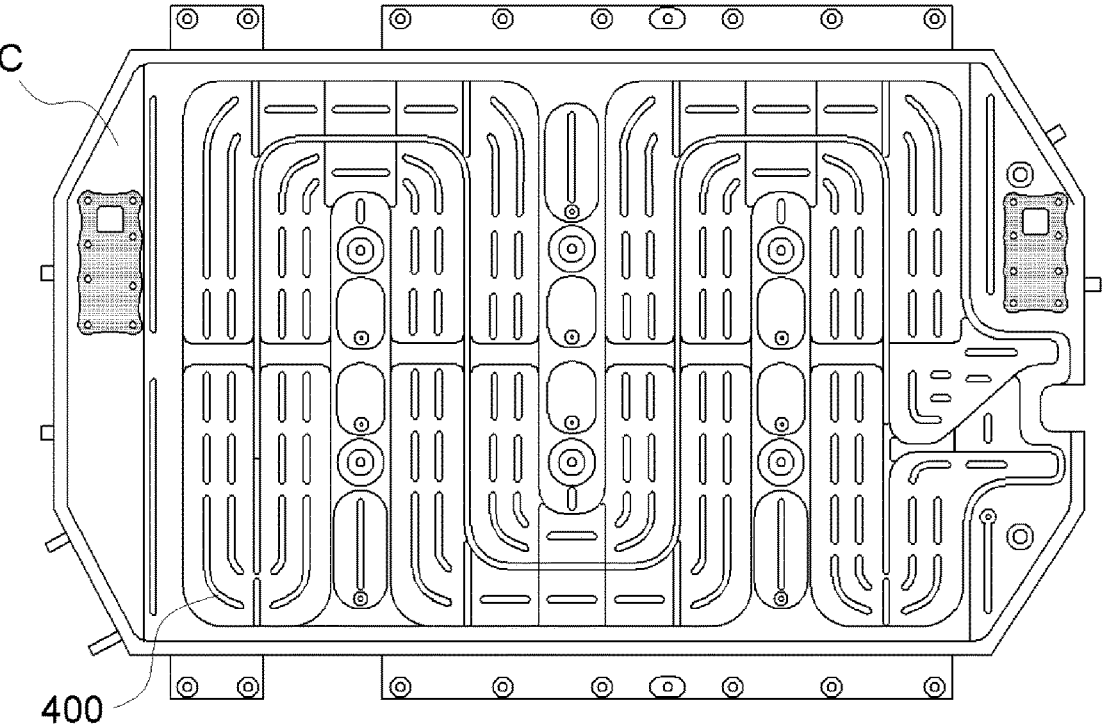
FIG. 2 is a view illustrating an installation path for a cooling water pipe according to one embodiment of the present invention.

FIG. 2 is a view illustrating the installation path for the cooling water pipe formed on the pipe wall surface according to one embodiment of the present invention.

Referring to FIGS. 1 and 2, the plurality of pipe wall surfaces 440 may be disposed on a battery case C. In addition, the plurality of pipe wall surfaces 440 may be formed to have different lengths. In addition, the pipe wall surfaces 440 may be formed on the battery case C so that curved and straight paths are formed on the battery case C. In this case, the length of the pipe wall surface 440 disposed on the curved path may be smaller the length of the pipe wall surface 440 disposed on the straight path. The cooling water pipes 450 may be disposed along the pipe wall surfaces 440 disposed as described above. In addition, positions of the cooling water pipes 450 may be fixed to the battery case C due to the pipe wall surfaces 440.

Meanwhile, the cooling module according to the present embodiment may include the cooling water pipe.

The cooling water pipe 450 may allow cooling water to flow in the cooling water pipe 450 to cool heat radiated from the battery cell 100 and the battery pack. The cooling water pipe 450 may be formed of a material with high thermal conductivity. In addition, the cooling water pipe 450 may adjust a flow rate [LPM] of the cooling water flowing in the cooling water pipe 450 through communication with the BMS 300. In this case, the cooling water pipe 450 may be provided with a sensor for measuring a flow rate to measure the flow rate of the cooling water. A signal corresponding to the flow rate measured in the cooling water pipe 450 may be transmitted to the BMS 300. A flow rate of the cooling water in the cooling water pipe 450 may be calculated and determined on the basis of the signal transmitted to the BMS 300. As an example, in the normal section in which battery swelling is not detected, the cooling water may flow at a flow rate of 20 LPM to 25 LPM. However, in the warning section in which battery swelling is suspected, the cooling water may flow in the cooling water pipe 450 at a flow rate of 25 LPM to 28 LPM. The cooling water pipes 450 may be disposed along a path formed between the pipe wall surfaces 440. The cooling water pipes 450 may be supported by the pipe wall surfaces 440, and thus the positions of the cooling water pipes 450 may be fixed. The cooling water pipe 450 disposed as described above may cool heat radiated from the battery cell or battery pack disposed at one side of the cooling water pipe 450.

Meanwhile, a gap filler 400a may be disposed between the battery cell 100 and the cooling module. The gap filler 400a may be a filler which fills a space such as an air gap formed between the cooling module 400 and the battery cell 100. The gap filler 400a may be formed of a material such as thermal grease or a thermal pad. Accordingly, heat exchange between the battery cell or battery pack and the cooling water pipes can be easily performed.

Figure 3:
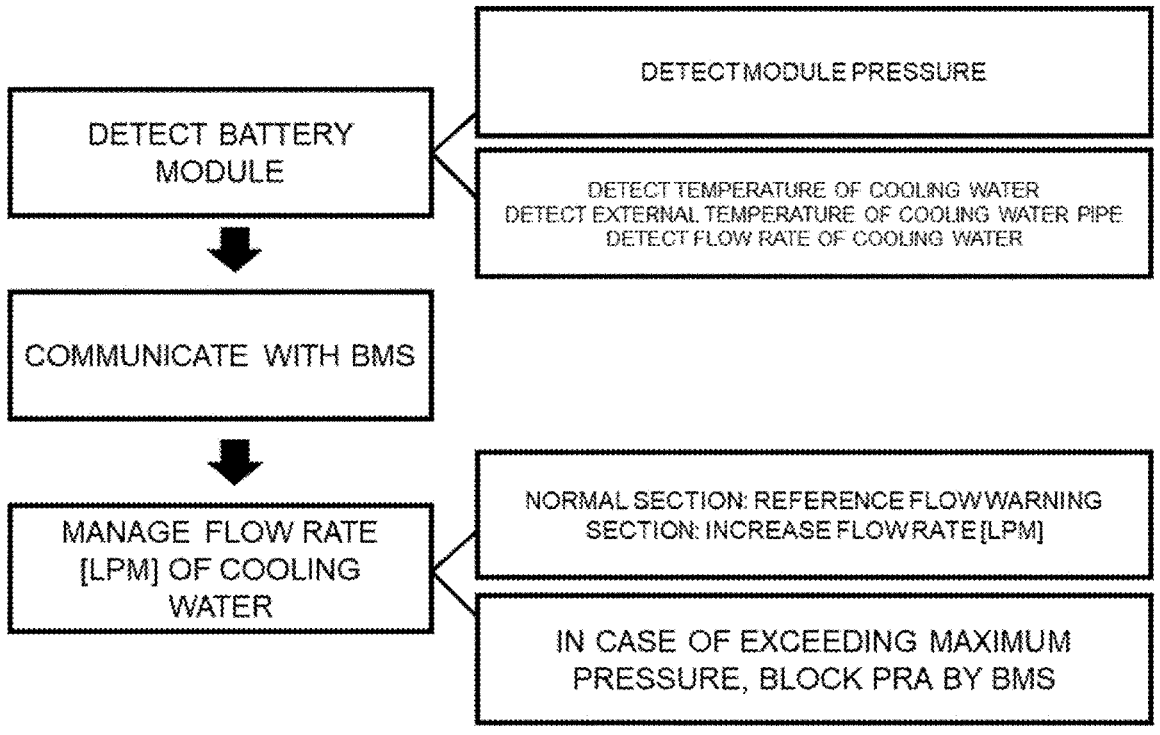
FIG. 3 is a flowchart illustrating an operation of a battery module of the present invention.

FIG. 3 is a flowchart illustrating an operation of the battery module of the present invention.

Referring to FIG. 3, a module pressure of the battery cell 100 may be measured in the sensing pad 200 disposed at one side of the battery cell 100. Pressure values set by a user may be set as a normal range of the module pressure of the battery cell 100 measured in the sensing pad 200. In this case, the pressure values set as the normal range may be in the range of 7 kPa to 10 kPa. In addition, a warning range of the module pressure of the battery cell 100 measured in the sensing pad 200 may be in the range of kPa to 20 kPa. The normal range and the warning range of the module pressure set as described above may be received by the BMS 300 to perform a corresponding operation. In this case, the pressure values set as the normal range and the warning range in the sensing pad 200 may be changed to correspond to the standard of a battery.

The BMS 300 may manage a flow rate [LPM] of cooling water flowing in the cooling water pipe when the normal range or the warning range is determined. A sensing operation of the cooling water pipe may be performed at the same time as surface pressure measurement of the sensing pad 200 is performed so that the flow rate [LPM] of the cooling water LPM may be managed as described above. In this case, a signal transmitted from the cooling water pipe to the BMS may have a temperature of the cooling water, an external temperature of the cooling water pipe, and a flow rate [LPM] of the cooling water. Accordingly, a flow rate of the cooling water pipe 450 may be calculated by the BMS 300 on the basis of a surface pressure measured in the sensing pad 200 and adjusted to correspond to the calculated flow rate.

As an example, a signal may be transmitted to a pump (not shown) which guides a flow of water to the cooling water pipe 450 so that the water flows in the cooling water pipe 450 at a flow rate of 20 LPM to 25 LPM in the normal section. However, in the warning section, a signal may be transmitted to the pump (not shown) so that the water flows at a flow rate of 25 LPM to 28 LPM. In this case, a value described as a flow rate of water flowing in the cooling water pipe 450 is only an example at which a reference flow rate [LPM] is changed to an increased flow rate [LPM] when the normal section is changed to the warning section, and a quantitative value of a flow rate of cooling water flowing in the cooling water pipe corresponds to the standard of the battery and may be sufficiently changed. In addition, the BMS 300 may transmit a signal to block a power relay assembly (PRA) when a maximum pressure of a set pressure is exceeded.

Heat radiated from the battery cell 100 can be easily managed by the cooling water pipe 450 in which a flow rate is managed as described above. The heat radiated from the battery cell 100 may cause a swelling phenomenon and occurrence of fire. Accordingly, the present invention can adjust a flow rate of cooling water flowing in the cooling water pipe 450 to adjust cooling efficiency, and thus efficient thermal management can be performed.

As described above, in the battery module according to the embodiments of the present invention, a pressure measured through module pressure sensing can be received by the BMS and divided into the normal section and the warning section to adjust a flow rate of cooling water flowing in the cooling water pipe, and thus the battery cell can be easily cooled.

According to the present invention, in a battery module according to embodiments, a pressure measured through module pressure sensing can be received by a BMS and divided into a normal section and a warning section to adjust a flow rate of cooling water flowing in a cooling water pipe to facilitate cooling of a battery cell.

However, technical effects which can be achieved through the embodiments of the present invention are not necessarily limited to the above-described effects. Other technical effects which are not described above will be clearly understood by those skilled in the art from the above specification including the detailed description.

While embodiments of the present invention have been described above, the present invention may be variously modified and changed by those skilled in the art by adding, changing, and removing components without departing from the range of the spirit of the present invention defined by the claims, and will fall within the scope of the present invention.

What is claimed is:

1. A battery module for an electric vehicle, comprising:
a battery cell (100) included in the battery module;
a sensing pad (200) attached to a side surface of the battery cell (100);
a battery management system (BMS, 300) which performs transmission and reception communication with the sensing pad (200); and
a cooling module (400) which is disposed under the battery cell (100) and in which a cooling water pipe (450) is disposed, wherein cooling water flows in the cooling water pipe (450),
wherein:
the cooling module (400) includes a cooling plate lower base (410) disposed at one side of the battery cell (100); and
the cooling plate lower base (410) includes a lower surface support end portion (411) which is horizontally formed, supports a lower side of the battery cell (100), is formed on a lower surface of the cooling plate lower base (410), and is in contact with a lower side of the cooling water pipe (450), and further includes a cooling welding end portion (412) formed so as to be spaced a predetermined distance upward from the lower surface support end portion (411),
wherein the cooling welding end portion (412) and the lower surface support end portion (411) are connected by a bonding inclined end portion (430) which extends upward at an inclined angle between 30 and 60 degrees from the lower surface support end portion (411) and then connected to the cooling welding end portion (412) forming the same inclined angle, such that the cooling welding end portion (412) and the lower surface support end portion (411) are parallel to each other,
wherein the cooling module (400) includes a plurality of pipe wall surfaces (440) that define a curved or straight path and have a cross section in an inverted "V" shape and two upward sides of the inverted "V" shape are in contact with outer circumference of the cooling water pipe (450) to form an installation path for the cooling water pipe (450),
such that the installation path for the cooling water pipe (450) is disposed between the bonding inclined end portion (430) and one upward side of the inverted "V" shape of one of the plurality of pipe wall surfaces (440) or is disposed between an upward side of the inverted "V" shape of one of the plurality of pipe wall surfaces (440) and an upward side of the inverted "V" shape of an adjacent one of the plurality of pipe wall surfaces (440).

2. The battery module of claim 1, wherein the sensing pad (200) is formed as a plurality of strain gauges to measure an expansion pressure of the side surface of the battery cell (100).

3. The battery module of claim 1, wherein:

the BMS (300) determines a normal section in a case in which a pressure measured in the sensing pad (200) is within a normal section;

the BMS (300) determines a warning section in a case in which a pressure measured in the sensing pad (200) is within a warning section; and when a pressure measured in the sensing pad (200) exceeds the warning section, a power relay assembly (PRA) is blocked.

4. The battery module of claim 3, wherein:

in the case of the normal section, the BMS (300) sets a reference flow rate [LPM] to a flow rate [LPM] of the cooling water flowing in the cooling water pipe (450); and

in the case of the warning section, the BMS (300) sets a flow rate [LPM] to be increased from the reference flow rate [LPM] to a flow rate [LPM] of the cooling water flowing in the cooling water pipe (450).

5. The battery module of claim 4, wherein, in the case of the warning section, the BMS (300) transmits a signal to a pump to increase or decrease the flow rate [LPM] of the cooling water flowing in the cooling water pipe to correspond to the measured pressure.

6. The battery module of claim 1, wherein each of the cooling welding end portion (412), the lower surface support end portion (411), and the bonding inclined end portion (430) is a flat structure.

7. The battery module of claim 1, wherein the cooling module (400) further includes a cooling plate upper base (420) such that the cooling water pipe (450) is disposed between the cooling plate upper base (420) and the cooling plate lower base (410), and each of the plurality of pipe wall surfaces (440) extends from the lower surface support end portion (411) to the cooling plate upper base (420).

* * * * *